(12) United States Patent
Huang et al.

(10) Patent No.: US 8,855,611 B2
(45) Date of Patent: Oct. 7, 2014

(54) SYSTEM FOR REAL-TIME PHOTOGRAPH PRINTING SERVICE AND METHOD FOR THE SAME

(75) Inventors: Wei-Chun Huang, Taipei (TW); Tsung-Hsing Hsieh, Taipei (TW)

(73) Assignee: Jogtek Corp., Taipei (TW)

( * ) Notice: Subject to any disclaimer, the term of this patent is extended or adjusted under 35 U.S.C. 154(b) by 839 days.

(21) Appl. No.: 13/050,922

(22) Filed: Mar. 17, 2011

(65) Prior Publication Data

US 2012/0135706 A1   May 31, 2012

(30) Foreign Application Priority Data

Nov. 30, 2010   (TW) ................ 99141454 A

(51) Int. Cl.
- *H04M 3/42* (2006.01)
- *G06F 3/12* (2006.01)
- *H04N 1/21* (2006.01)
- *H04N 1/00* (2006.01)
- *H04N 101/00* (2006.01)

(52) U.S. Cl.
CPC .......... *H04N 1/00307* (2013.01); *G06F 3/1267* (2013.01); *H04N 1/2166* (2013.01); *H04N 1/00347* (2013.01); *G06F 3/1204* (2013.01); *H04N 2101/00* (2013.01); *G06F 3/1288* (2013.01)
USPC ...................................................... 455/414.1

(58) Field of Classification Search
USPC ........................................................ 455/414.1
See application file for complete search history.

(56) References Cited

U.S. PATENT DOCUMENTS

2008/0114680 A1 * 5/2008 Toutonghi et al. .............. 705/50

FOREIGN PATENT DOCUMENTS

| CN | 1756286 A | 4/2006 |
| CN | 101241574 A | 8/2008 |
| EP | 1320250 A1 | 6/2003 |
| EP | 1903429 A2 | 3/2008 |
| TW | 403853 B | 9/2000 |

OTHER PUBLICATIONS

Taiwan Official Action Issued on Jun. 27, 2013.
China Official Action Issued on Oct. 12, 2013.

* cited by examiner

*Primary Examiner* — Justin Lee
(74) *Attorney, Agent, or Firm* — Chun-Ming Shih; HDLS IPR Services

(57) ABSTRACT

A system for real-time photograph printing service includes a personal terminal, a telecom terminal, and a printing service terminal. The personal terminal is triggered to transmit a digital photograph file and a phone number according to the personal terminal. The telecom terminal fetches a communication address of a user of the personal terminal according to the received telephone number, and the printing service terminal receives the digital photograph file to print out a physical photograph. Finally, the printed photograph is send to the communication address for user by post.

10 Claims, 9 Drawing Sheets

SYSTEM FOR REAL-TIME PHOTOGRAPH PRINTING SERVICE AND METHOD FOR THE SAME

BACKGROUND OF THE INVENTION

1. Field of the Invention

The present invention relates to photograph printing, in particularly to the system and method of the photograph printing service.

2. Description of Related Art

Photograph is an important media for recording and displaying the activities of living, traveling and working. After the digital camera was invented in recent decades, the photograph can be generated and stored in digital files, which widely expands the use of the photograph.

As the internet technology is developing, nowadays the transmission of the photograph on the internet becomes much easier. Beside that, as the semiconductor technology keeps evolving, the capacity of storage device is increasing and its cost is cheaper. That provide users with more convenient in storing and using the photograph.

Although it is very convenient for users to store digital photograph in a storage device, somehow the need of printing out the physical photograph from digital format still exists. However, in some situations, users will still need physical photograph for memorial purpose or the others.

Generally speaking, there are few steps to print out photograph from digital files as follows. First, the customer has to choose the digital photo files to be printed, and then bring the digital photo files to printing shop. The customer has to wait for certain time and then go the printing shop again for getting the printed photograph.

However, there are several disadvantages among the above steps. The customer needs to arrive at the printing shop twice, the first time is for delivering the digital photo files and the second time is for receiving the physical photograph. And the time duration between the delivering the digital photo files and the receiving the physical photograph will also eliminate the desire to obtain the physical photograph. Because of the above mentioned inconvenience, user usually will wait for a long time to collect enough digital photograph files and then print them out.

Therefore, there are some web portals offering printing services, which allow user to upload digital photograph files through computers and the internet. After printing out from the digital photograph files, the physical photograph will be sent to the user by post. User will no longer need to arrive at the printing shop to print out the physical photograph.

Such web portals will offer printing services after obtain users' registration information which may include real name, phone number, address or even the credit card number. Such that the physical photograph can be sent to the user according to the name and address information and charged the printing and shipping fees according to the credit card information.

However, many users are not willing to provide personal information for registration on internet, not only because the data filling procedures are tiresome, but also because the account, password and related data need to be memorized to access the web portals. Beside that, a computer is needed for performing the above mentioned files upload procedures, which limits the application timing of the printing services and also reduce the frequency of using the printing services.

SUMMARY OF THE INVENTION

The main objective of the present invention is to provide a system for real-time photograph printing service and method for the same, which can send the captured digital photograph file through internet for printing out, and then send the physical photograph to the user by post.

For achieving the above mentioned objective, the real-time photograph printing service system including a personal terminal, a telecom terminal and a printing service terminal. The personal terminal is for capturing and storing a digital photograph file. The personal terminal device has a service executing button. When the service executing button is pressed, the personal terminal device can transmit the digital photograph file and a telephone number. The telecom terminal is for receiving the telephone number and providing a communication address according to the telephone number. The printing service terminal receives the digital photograph file and prints out a physical photograph. The printing service terminal can receive the communication address from the telecom terminal and send the physical photograph to the communication address by post.

Comparing to the conventional printing service, the user can send the captured digital photograph file through internet for printing out, and does not need to arrive at the printing shop. The printing service terminal can receive the communication address of the user corresponding to the telephone number of the personal terminal from the telecom terminal and send the printed physical photograph to the user. The user does not need to arrive at the printing shop for obtaining the printed photograph, and does not need to waste energy and time for delivering the digital photo files and the receiving the physical photograph. Besides, since the printing fee can be listed in the same bill of the telecom terminal, the user does not need to provide personal information for registration on internet, which can improve the convenience of the printing service and thus increase the frequency of using the printing services

DETAILED DESCRIPTION OF THE INVENTION

A detailed description of the present invention will be made with reference to the accompanying drawings.

Figure 1:
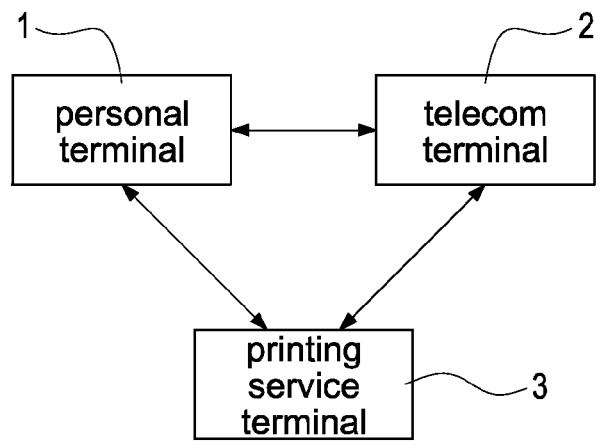
FIG. 1 shows a block diagram of the real-time photograph printing service system according to an embodiment of the present invention.
Figure 3A:
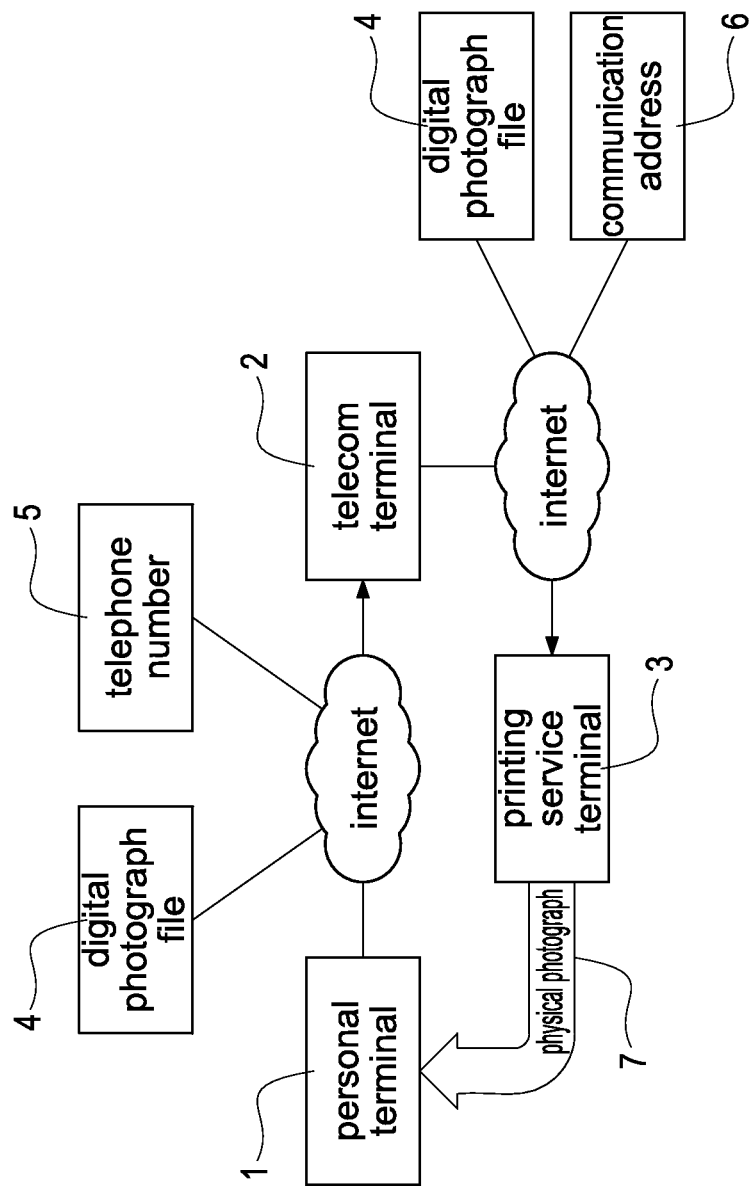
FIG. 3A is a schematic views representing the first embodiment of the present invention.

FIG. 1 shows a block diagram of the real-time photograph printing service system according to an embodiment of the present invention. The service system mainly includes a personal terminal 1, a telecom terminal 2 and a printing service terminal 3. The personal terminal 1, a telecom terminal 2 and a printing service terminal 3 communicate with each other through internet. As FIG. 3A shows, the personal terminal 1 is used for capturing and storing a digital photograph file 4. The telecom terminal 2 provides a communication address 6 according to the telephone number 5 of the personal terminal 1 of the user. The printing service terminal 3 is used for printing a physical photograph 7 from the digital photograph file 4. After the printing is finished, the printing service terminal 3 can send the physical photograph 7 to the communication address 6 by post. Therefore, the user himself needs not to arrive at the printing shop for delivering the digital photograph file 4 and picking up the printed physical photograph.

Figure 2:
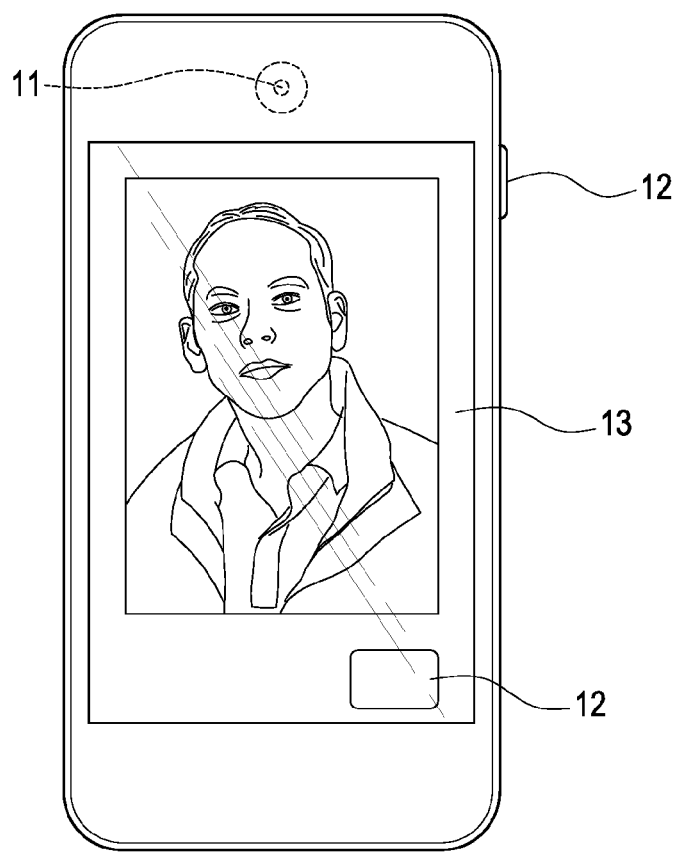
FIG. 2 shows a personal terminal 1 of an embodiment of the present invention.

FIG. 2 shows a personal terminal 1 of an embodiment of the present invention. The personal terminal 1 is, but not limited thereto, a mobile phone with image capturing function or a digital camera with internet communication function. The personal terminal 1 in FIG. 2 is a mobile phone with a camera module 11 for illustration.

User can use the camera module 11 for capturing images and storing them as digital photograph files 4. After the digital photograph files 4 are stored, a service executing button 12 can be pressed to perform the click-to-print printing service of the present invention. The service executing button 12 is a physical button or a graphic icon displayed on a touch panel screen 13 when capturing images or reviewing the digital photograph files 4.

Figure 3B:
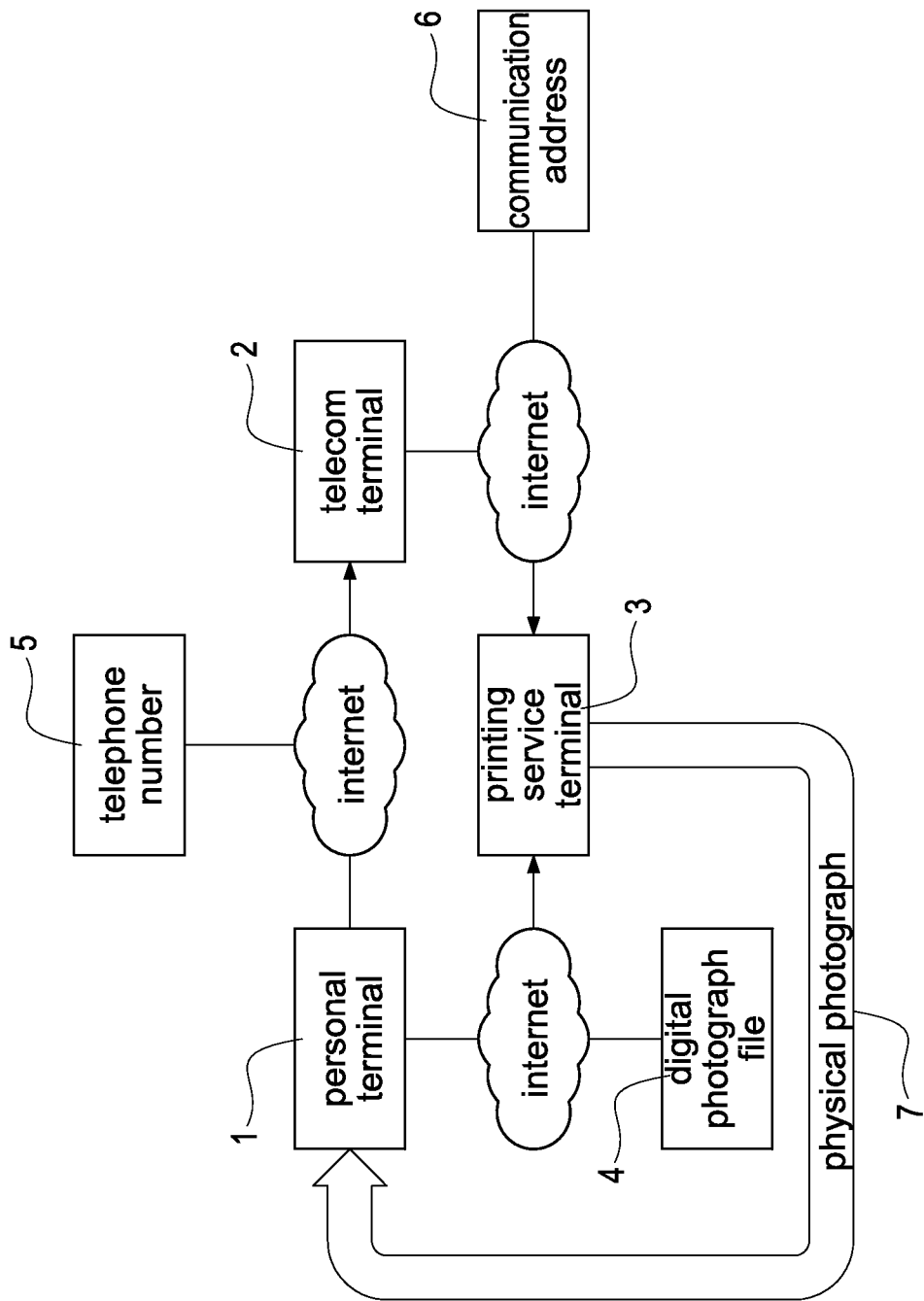
FIG. 3B is a schematic views representing the second embodiment of the present invention.
Figure 3C:
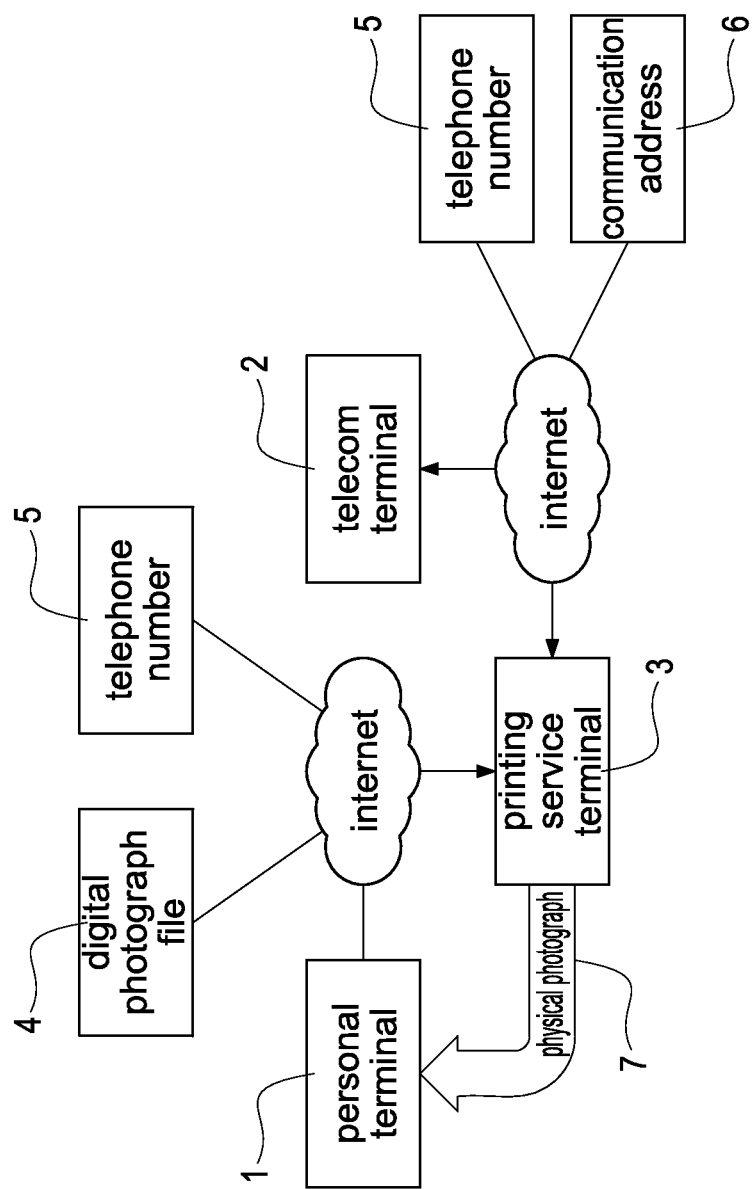
FIG. 3C is a schematic views representing the third embodiment of the present invention.

FIG. 3A, FIG. 3B and FIG. 3C are respectively schematic views representing the first, the second and the third embodiments of the present invention. In FIG. 3A, the personal terminal 1 will transmit the digital photograph file 4 and the telephone number 5 to the telecom terminal 2 after the service executing button 13 is pressed to perform the printing service of the present invention. The telecom terminal 2 will fetch the communication address 6 from the database system thereof according to the telephone number 5, and transmit the digital photograph file 4 and the communication address 6 to the printing service terminal 3. After the physical photograph 7 is printed out from the digital photograph file 4, the printing service terminal 3 will send the physical photograph 7 to the communication address 6 of the user.

It should be mentioned that if the personal terminal 1 is a mobile phone, the telephone number 5 is the phone number dedicated to the personal terminal 1, and the telecom terminal 2 is the communication provider of the telephone number 5. The telecom terminal 2 can fetch the personal information of the user including the name and the communication address 6 according to the telephone number 5 from the database system thereof. In practical use, the user needs to provide only his digital photograph file 4 and the telephone number 5. No registration procedure and no any further personal information are required, which makes the printing service more convenient.

Moreover, if the physical photograph 7 is not for the user himself but for someone assigned, the user can further input the telephone number of the assigned person while the service executing button 13 is pressed to perform the service of the present invention. In this embodiment, the telecom terminal 2 is the communication provider of the telephone number 5 of the assigned person by the user. Therefore the telecom provider 2 can fetch the personal information from the database system thereof according to the telephone number 5, and then send the physical photograph 7 to the assigned person.

In FIG. 3B, the personal terminal 1 can transmit the digital photograph file 4 to the printing service terminal 3 and transmit the telephone number 5 to the telecom terminal 2. After the telecom terminal 2 fetched the communication address 6 from its database, the communication address 6 will be transmitted to the printing service terminal 3. The printing service terminal 3 will then print out the physical photograph and send to the communication address 6 by post.

In FIG. 3C, the personal terminal 1 can transmit the digital photograph file 4 and the telephone number 5 to the printing service terminal 3. After that, the printing service terminal 3 will transmit the telephone number 5 to the telecom terminal 2. And the telecom terminal 2 will fetch the corresponding communication address 6 from the database thereof and send the communication address 6 to the printing service terminal 3. After the physical photograph 7 is printed out, the printing service terminal 3 will send the physical photograph 7 to the communication address 6 by post.

Figure 4:
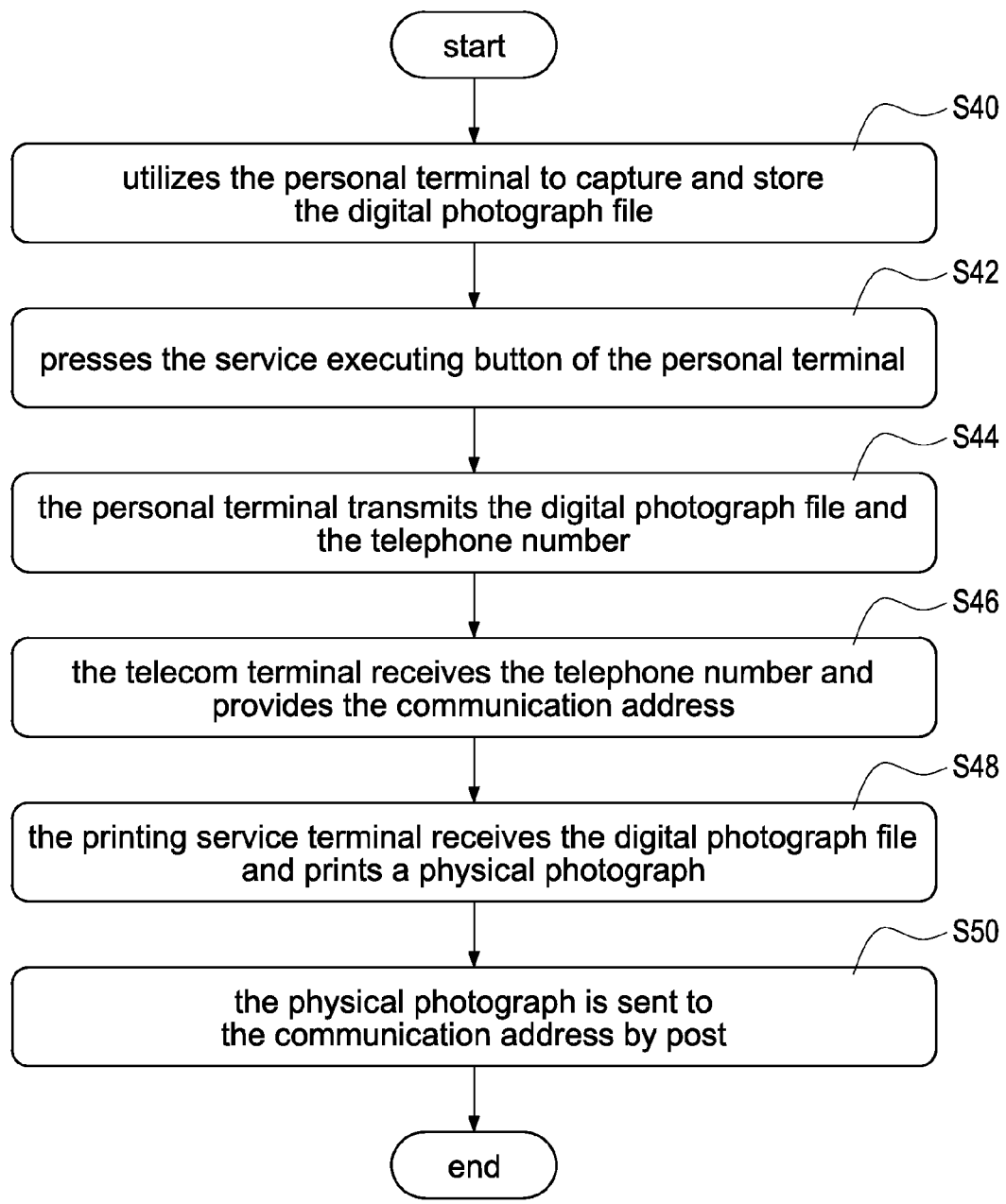
FIG. 4 shows a flow chart of the service according to an embodiment of the present invention.

FIG. 4 shows a flow chart of the service according to an embodiment of the present invention. At the beginning, the user utilizes the personal terminal 1 to capture and store the digital photograph file 4 (as the step S40), then presses the service executing button 13 of the personal terminal 1 (as the step S42) to start the real-time printing service of the present invention. After that, the personal terminal 1 transmits the digital photograph file 4 and the telephone number 6 (as the step S44). The telephone number 5 belongs to the personal terminal 1 or is the telephone number assigned by a user.

Then, the telecom terminal 2 receives the telephone number 5 and provides the communication address 6 from the database thereof according to the telephone number 5 (as step S46). The printing service terminal 3 receives the digital photograph file 4 and prints a physical photograph 7 from the digital photograph file 4 (as step S48). The physical photograph 7 is sent to the communication address 6 by post (as step S50).

The telecom terminal 2 receives the telephone number 5 and fetches the corresponding communication address 6. The printing service terminal 3 receives the digital photograph file 4 and prints out the physical photograph 7. The telecom terminal 2 can receive the telephone number 5 from the personal terminal 1 or the printing service terminal 3. The printing service terminal 3 can receive the digital photograph file 4 from the personal terminal 1 or the telecom terminal 2. The detailed description is provided below.

Figure 5A:
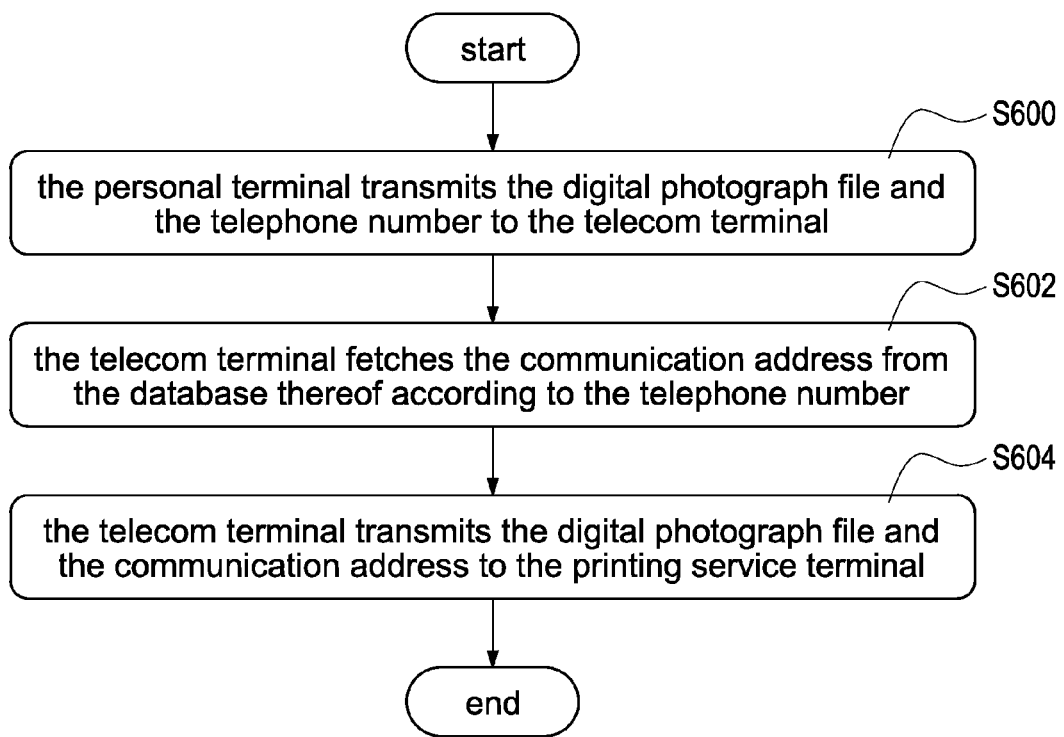
FIG. 5A is a flow chart illustrating the data transmission according to the first embodiment of the present invention.

FIG. 5A is a flow chart illustrating the data transmission according to the first embodiment of the present invention. As FIG. 3A shows, in the step S44, the personal terminal 1 can transmit the digital photograph file 4 and the telephone number 5 to the telecom terminal 2 (as the step S600). Then, the telecom terminal 2 can fetch the communication address 6 from the database thereof according to the telephone number 5 (as the step S602). Finally, the telecom terminal 2 will transmit the digital photograph file 4 and the communication address 6 to the printing service terminal 3 to proceed the printing service (as the step S604).

Figure 5B:
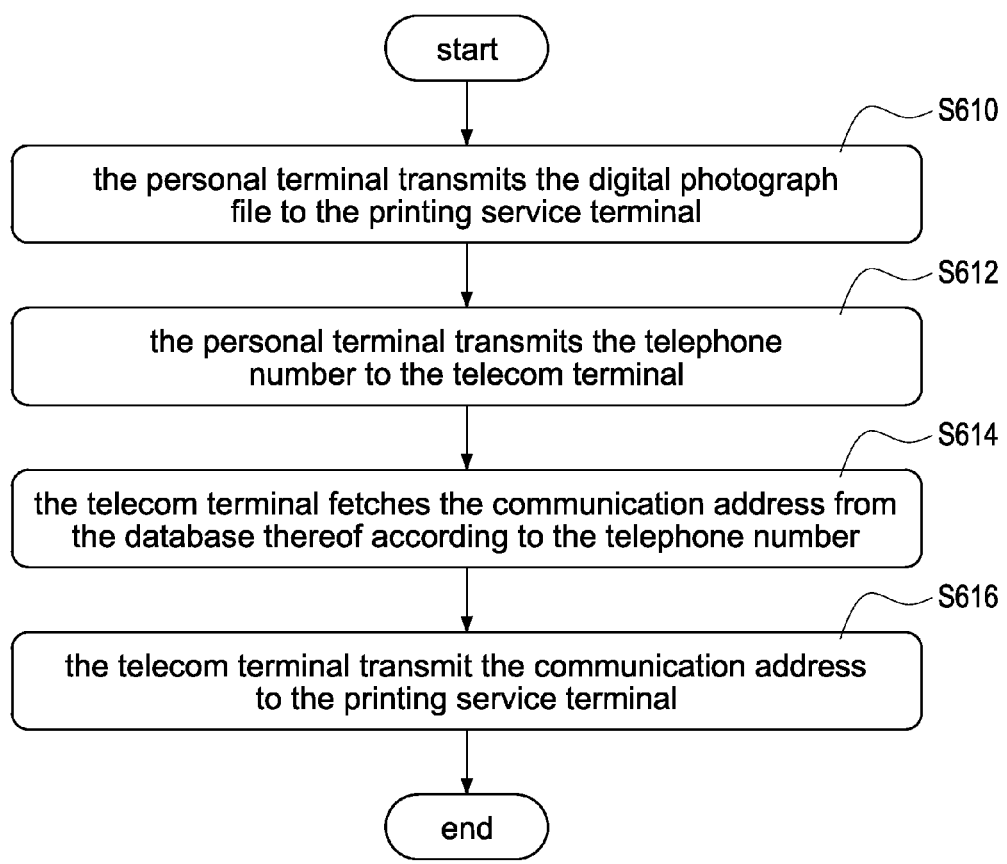
FIG. 5B is the flow chart illustrating the data transmission according to the second embodiment of the present invention.

FIG. 5B is the flow chart illustrating the data transmission according to the second embodiment of the present invention. As FIG. 3B shows, in the step S44, the personal terminal 1 can transmit the digital photograph file 4 to the printing service terminal 3 (as the step S610), and transmit the telephone number 5 to the telecom terminal 2 (as the step S612). It should be mentioned that the step S612 can be performed after the step S610 or before the step S610.

The telecom terminal 2 can fetch the communication address 6 from the database thereof according to the telephone number 5 (as the step S614), and transmit the communication address 6 to the printing service terminal 3 (as the step S616). Therefore, the printing service terminal 3 can print out the digital photograph file 4 from the physical photograph 7 and send the physical photograph 7 to the communication address 6 by post.

Figure 5C:
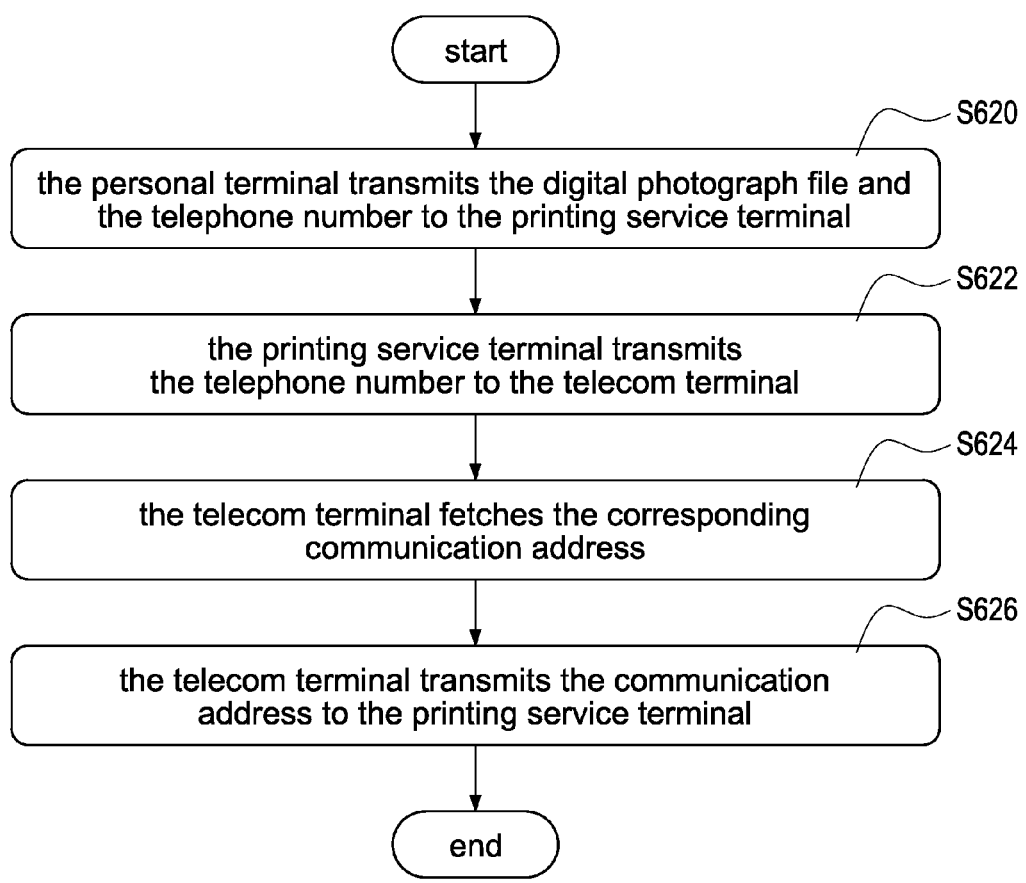
FIG. 5C is a flow chart illustrating the data transmission according to the third embodiment of the present invention.

FIG. 5C is a flow chart illustrating the data transmission according to the third embodiment of the present invention. As FIG. 3C shows, in the step S44, the personal terminal 1 can transmit the digital photograph file 4 and the telephone number 5 to the printing service terminal 3 (as the step S620). Then, the printing service terminal 3 can transmit the telephone number 5 to the telecom terminal 2 (as the step S622) for the fetching requirement of the communication address 6. After receiving the telephone number 5, the telecom terminal 2 will fetch the corresponding communication address 6 from the database thereof (as the step S624). Finally, the telecom terminal 2 will transmit the communication address 6 to the printing service terminal 3 (as the step S626).

Figure 6:
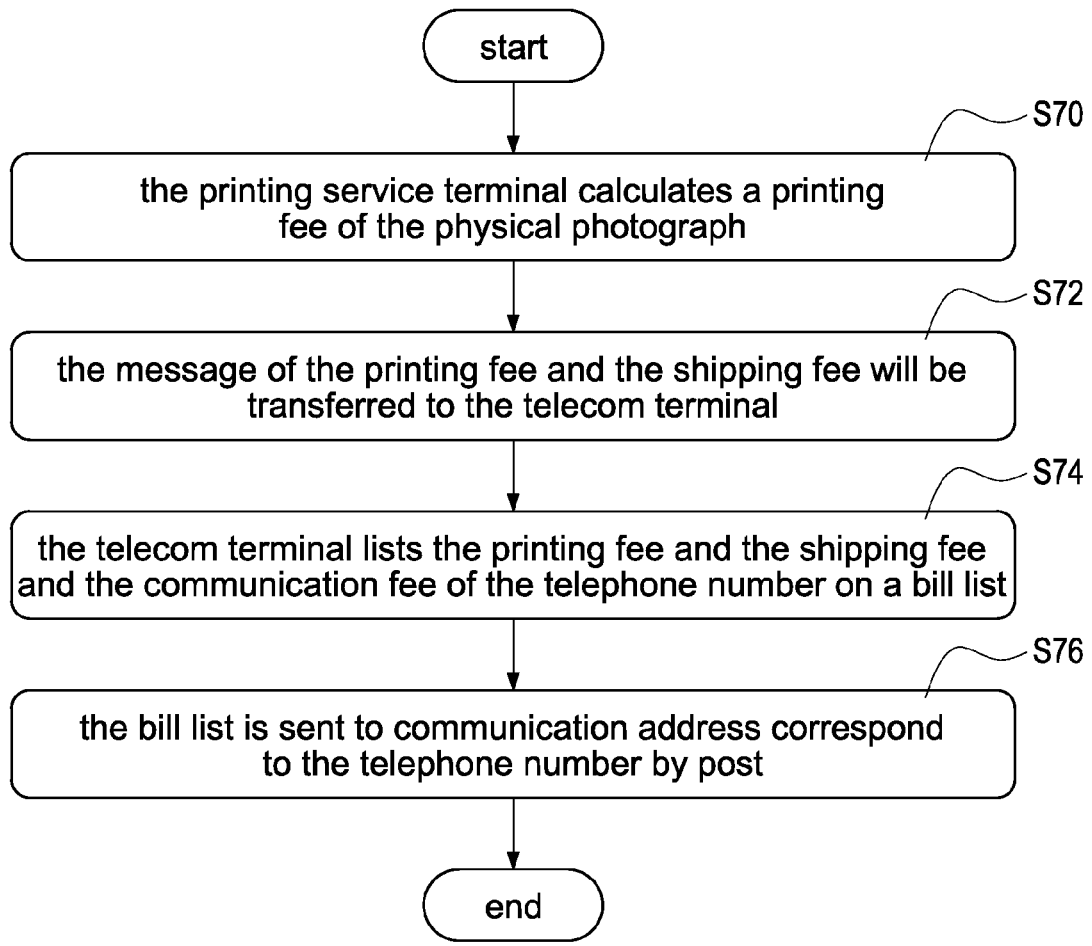
FIG. 6 is a flow chart illustrating the payment calculation according to the present invention.

FIG. 6 is a flow chart illustrating the payment calculation according to the present invention. At the beginning, the printing service terminal 3 will calculate a printing fee and a shipping fee of the physical photograph 7 (as the step S70). Then, the message of the printing fee and the shipping fee will be transferred to the telecom terminal 2 (as the step S72). The telecom terminal 2 will list the printing fee and the shipping fee and the communication fee of the telephone number 5 on a bill list (as the step S74). Finally, the bill list will be send to communication address 6 correspond to the telephone number 5 by post (as the step S76). In this embodiment, the communication address 6 is the same as the postal address for the bill of the communication fee of the telephone number 5.

In conclusion, the user will not receive any additional bill list. In another aspect, the printing fee and the shipping fee of physical photograph 7 will be listed in the original bill list of the communication fee of the telephone number 5. Therefore, the convenience of the printing service is improved, which will be appreciated by the user. By the way, the service provider may send the physical photograph 7 with the bill list from the telecom terminal 2 and other advertising sheets. That means the shipping fee can be deducted. And the real-time printing service can be more attractive and lower cost.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A real-time photograph printing service system, comprising:
    a personal terminal for capturing and storing a digital photograph file, the personal terminal having a service executing button, wherein when the service executing button is pressed, the personal terminal can transmits the digital photograph file and a telephone number;
    a telecom terminal for receiving the telephone number and providing a communication address according to the telephone number; and
    a printing service terminal receiving the digital photograph file and printing out a physical photograph, wherein the printing service terminal receives the communication address from the telecom terminal and sends the physical photograph to the communication address by post,
    wherein the digital photograph file is transmitted to the printing service terminal by the personal terminal, and the telephone number is transmitted to the telecom terminal by the personal terminal.

2. The real-time photograph printing service system as claim 1, wherein the personal terminal is a mobile phone with image capturing function or a digital camera with internet communication function.

3. The real-time photograph printing service system as claim 1, wherein the telephone number belongs to the personal terminal or is a telephone number assigned by a user, and the telecom terminal is a communication provider of the telephone number.

4. The real-time photograph printing service system as claim 1, wherein the service executing button is a physical button or a graphic icon displayed on a touch panel screen.

5. A real-time photograph printing service method, for performing among a personal terminal, a telecom terminal and a printing service terminal, the method comprising steps of:
    pressing a service executing button of the personal terminal;
    transmitting a digital photograph file and a telephone number by the personal terminal;
    providing a communication address according to the telephone number by the telecom terminal;
    printing a physical photograph from the digital photograph file by the printing service terminal; and
    sending the physical photograph to the communication address by post,
    wherein the digital photograph file is transmitted to the printing service terminal by the personal terminal, and the telephone number is transmitted to the telecom terminal by the personal terminal.

6. The real-time photograph printing service method as claim 5, further comprising the step of capturing and storing the digital photograph file by the personal terminal.

7. The real-time photograph printing service method as claim 5, further comprising the steps of:
    calculating a printing fee and a shipping fee and transmitting the message of the printing fee and the shipping fee to the telecom terminal;
    listing the printing fee and the telecom fee and the communication fee of the telephone number on a bill list; and
    sending the bill list to the communication address corresponding to the telephone number by post.

8. The real-time photograph printing service method as claim 5, further comprising the step of transmitting the communication address to the printing service terminal by the telecom terminal.

9. A real-time photograph printing service method, for performing among a personal terminal, a telecom terminal and a printing service terminal, the method comprising steps of:
    pressing a service executing button of the personal terminal;
    transmitting a digital photograph file and a telephone number by the personal terminal;
    providing a communication address according to the telephone number by the telecom terminal;
    printing a physical photograph from the digital photograph file by the printing service terminal; and
    sending the physical photograph to the communication address by post,
    wherein the digital photograph file and the telephone number are transmitted to the printing service terminal by the personal terminal.

10. The real-time photograph printing service method as claim 9, further comprising the steps of:
    the telephone number is transmitted to the telecom terminal by the printing service terminal; and the communication address is transmitted to the printing service terminal by the telecom terminal.

* * * * *